(12) United States Patent
Nakao et al.

(10) Patent No.: US 6,395,835 B1
(45) Date of Patent: May 28, 2002

(54) THERMOCURABLE RESIN COMPOSITION FOR COATING

(75) Inventors: Yasushi Nakao, Ohbu; Shigeru Nakamura, Toyota, both of (JP)

(73) Assignee: Kansai Paint Co., Ltd., Hyogo-ken (JP)

( * ) Notice: Subject to any disclaimer, the term of this patent is extended or adjusted under 35 U.S.C. 154(b) by 0 days.

(21) Appl. No.: 09/513,195

(22) Filed: Feb. 25, 2000

(30) Foreign Application Priority Data

Feb. 25, 1999 (JP) .......................................... 11-047650

(51) Int. Cl.[7] .............................. C08L 35/00; C07G 1/00
(52) U.S. Cl. ................... 525/207; 525/208; 106/287.22
(58) Field of Search ................ 525/207, 208; 106/287.22

(56) References Cited

U.S. PATENT DOCUMENTS

| | | | | |
|---|---|---|---|---|
| 4,076,765 A | * | 2/1978 | Nakahara et al. | 525/207 |
| 5,270,392 A | * | 12/1993 | Okude | 525/207 |
| 5,367,027 A | * | 11/1994 | Fushimi | 525/208 |
| 5,374,682 A | * | 12/1994 | Gouda et al. | 525/207 |
| 5,376,704 A | * | 12/1994 | Barsotti | 523/414 |
| 5,397,603 A | * | 3/1995 | Okude et al. | 525/208 |
| 5,399,384 A | * | 3/1995 | Fushimi | 525/207 |
| 5,516,846 A | * | 5/1996 | Shalati et al. | 525/207 |
| 5,580,926 A | * | 12/1996 | Shalati et al. | 525/207 |
| 5,760,137 A | * | 6/1998 | Miyazoe et al. | 525/208 |
| 5,902,644 A | * | 5/1999 | Okumara et al. | 525/208 |
| 6,037,416 A | * | 3/2000 | Iwamoto et al. | 525/207 |

* cited by examiner

*Primary Examiner*—Philip Tucker
(74) *Attorney, Agent, or Firm*—Wenderoth, Lind & Ponack, L.L.P.

(57) ABSTRACT

The present invention provides a thermocurable resin composition for coating with good storage stability and capable of forming a coating film excellent in low temperature curability, acid resistance, scratch resistance etc., containing a polymer obtained by half-esterifying with a monohydric alcohol the acid anhydride group of an acid anhydride group-containing polymer, obtained by copolymerizing a polymerizable, unsaturated, half-esterified product obtained by half-esterification of a hydroxyl group-containing, polymerizable unsaturated monomer and an acid anhydride group-containing compound in the proportion of 1–1.5 moles of the acid anhydride group per 1 mole of the hydroxyl group, an acid anhydride group-containing, polymerizable unsaturated monomer and another polymerizable unsaturated monomer; and a polymer having both hydroxyl group and epoxy group in the molecule.

27 Claims, No Drawings

THERMOCURABLE RESIN COMPOSITION FOR COATING

BACKGROUND OF THE INVENTION

1. Field of the Invention

The present invention relates to a thermocurable resin composition for coating with good storage stability and capable of forming a coating film excellent in low temperature curability, acid resistance, scratch resistance etc.

2. Description of the Prior Art

As a topcoat paint for motorcar body, paints containing a hydroxyl group-containing resin and melamine resin are widely used. The coating film formed by using said paints, however, has a defect of insufficient acid resistance. Therefore, an "acid-epoxy type paint", without using a melamine resin, applying a crosslinking reaction between carboxyl group and epoxy group has been proposed. The coating film formed by using this type of paint has an improved acid resistance, but has a defect of being prone to generate scratches on the coating surface during car washing and improvement of these defects has been strongly demanded.

The main purpose of the present invention is to provide a thermocurable resin composition for coating useful as a novel "acid-epoxy type paint" capable of forming a coating film excellent in acid resistance and scratch resistance and excellent in storage stability, low temperature curability of the coating film, etc. The present inventors found out, this time, that the above-mentioned purpose could be achieved by conducting the introduction of a carboxyl group into the base resin by using a polymerizable monomer obtained by half-esterification of a hydroxyl group-containing, polymerizable unsaturated monomer and an acid anhydride group-containing compound in a prescribed proportion and have completed the present invention.

SUMMARY OF THE INVENTION

Thus, according to the present invention, there is provided a thermocurable resin composition for coating characterized by containing (i) a polymer (B), obtained by copolymerizing
  (a) a polymerizable, unsaturated, half-esterified product obtained by half-esterification of a hydroxyl group-containing, polymerizable unsaturated monomer and an acid anhydride group-containing compound in the proportion of 1–1.5 moles of acid anhydride group per 1 mole of hydroxyl group,
  (b) an acid anhydride group-containing, polymerizable unsaturated monomer, and
  (c) another polymerizable unsaturated monomer, to form an acid anhydride group-containing polymer (A) and half-esterifying the acid anhydride group of the polymer (A) with
  (d) a monohydric alcohol, and (ii) a polymer (C) having both hydroxyl group and epoxy group in the molecule.

Then the thermocurable resin composition for coating of the present invention (hereinafter referred to as the present composition) will be described in more detail.

DETAILED DESCRIPTION OF THE INVENTION

Polymer (A)

The polymer (A) used in the present invention is an acid anhydride group-containing polymer obtained by copolymerizing a polymerizable, unsaturated, half-esterified product (a) obtained by half-esterification of a hydroxyl group-containing, polymerizable unsaturated monomer and an acid anhydride group-containing compound in the proportion of 1–1.5 moles of acid anhydride group per 1 mole of hydroxyl group, an acid anhydride group-containing, polymerizable unsaturated monomer (b) and another polymerizable unsaturated monomer (c).

The hydroxyl group-containing, polymerizable unsaturated monomer used for the preparation of the above-mentioned polymerizable, unsaturated, half-esterified product (a) is a compound having each one of hydroxyl group and polymerizable, unsaturated carbon-carbon double bond in the molecule and there can be mentioned, for example, a monoesterified product (for example, a hydroxyalkyl ester) of a polymerizable, unsaturated carboxylic acid such as acrylic acid or methacrylic acid and a dihydric alcohol (diol) of a carbon number of 2–24. Particularly, in order to improve the scratch resistance of the coating film to be formed, monoesterified products with dihydric alcohols of a carbon number of 3–10 are preferred. Moreover, as a hydroxyl group-containing, polymerizable unsaturated monomer, an addition product of an endocyclic ester group-containing compound (lactone) such as ε-caprolactone to a polymerizable unsaturated aliphatic carboxylic acid such as acrylic acid or methacrylic acid can be preferably used.

As specific examples of such a hydroxyl group-containing, polymerizable unsaturated monomer, there can be mentioned hydroxyethyl acrylate, hydroxyethyl methacrylate, hydroxypropyl acrylate, hydroxypropyl methacrylate, hydroxybutyl acrylate, hydroxybutyl methacrylate, hydroxyhexyl acrylate, hydroxyhexyl methacrylate, PLACCEL FM or FA series (made by Daicel Chemical Industries Ltd., trade name; ring-open esterified products of ε-caprolactone with acrylic acid or methacrylic acid, etc.

The acid anhydride group-containing compound is a linear or cyclic compound, having an acid anhydride group

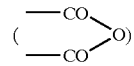

but containing no polymerizable unsaturated bond, which easily half-esterifies with a hydroxyl group in the above-mentioned hydroxyl group-containing, polymerizable unsaturated monomer to form each one mole of carboxyl group and ester group per 1 mole of acid anhydride group, and includes, for example, succinic anhydride, phthalic anhydride, tetrahydrophthalic anhydride, hexahydrophthalic anhydride, Himic® anhydride, trimellitic anhydride, methylcyclohexenetricarboxylic anhydride, pyromellitic anhydride etc. Particularly succinic anhydride is preferred, because the reactivity of the carboxyl group formed by its half-esterification is high.

The polymerizable, unsaturated, half-esterified product (a) is obtained by half-esterification of the above-mentioned hydroxyl group-containing, polymerizable unsaturated monomer and the acid anhydride group-containing compound in the proportion of 1 mole of the hydroxyl group in the former unsaturated monomer and 1–1.5 moles, preferably 1.02–1.3 moles, particularly preferably 1.05–1.25 moles of the acid anhydride group of the latter compound. When the proportion of the acid anhydride group per 1 mole of the hydroxyl group here is less than 1 mole, unreacted hydroxyl group-containing, polymerizable unsaturated monomer remains and the storage stability of the present composition tends to lower and, on the other hand, when it is more than 1.5 moles, the water resistance of the cured coating film formed from the present composition may be deteriorated.

By reacting the hydroxyl group-containing, polymerizable unsaturated monomer and the acid anhydride group-containing compound in the proportion in the above-mentioned range in the preparation of the polymerizable, unsaturated, half-esterified product (a), there remains almost no unreacted hydroxyl group-containing, polymerizable unsaturated monomer or at all and there is no lowering of the storage stability. On the other hand, there may remain unreacted acid anhydride group-containing compound, which is reacted with a monohydric alcohol and half-esterified at the next step, and the product participates in the crosslinking reaction with the polymer (C) and therefore it is not a factor to deteriorate the performance of the coating film.

The half-esterification reaction of the hydroxyl group-containing, polymerizable unsaturated monomer and the acid anhydride group-containing compound can be conducted by a usual process, for example, at the temperture of room temperature to about 150° C., suitably in an organic solvent inert to the reaction.

The acid anhydride group-containing, polymerizable unsaturated monomer (b) is a compound having each one acid anhydride group capable of easily half-esterifying with a monohydric alcohol and polymerizable unsaturated carbon-carbon double bond in the molecule and there can be specifically mentioned, for example, maleic anhydride, itaconic anhydride, citraconic anhydride etc.

Other polymerizable unsaturated monomer (c) is a compound having at least one polymerizable unsaturated bond in the molecule and copolymerizable with the above-mentioned half-esterified product (a) and the unsaturated monomer (b) and there can be specifically mentioned, for example, $C_1$–$C_{24}$ alkyl esters of acrylic acid or methacrylic acid such as methyl (meth)acrylate, ethyl (meth)acrylate, propyl (meth)acrylate, n-butyl (meth)acrylate, isobutyl (meth)acrylate, t-butyl (meth)acrylate, 2-ethylhexyl (meth) acrylate, lauryl (meth)acrylate, stearyl (meth)acrylate etc.; vinyl aromatic compounds such as styrene, α-methylstyrene, vinyltoluene etc.; olefins such as ethylene, propylene etc.; unsaturated nitriles such as acrylonitrile, methacrylonitrile etc.; unsaturated amides such as acrylamide, methacrylamide, N-methylacrylamide etc.; vinyl compounds such as vinyl acetate, vinyl chloride, 2-vinylpyridine, 4-vinylpyridine etc.

The polymer (A) is an acid. anhydride group-containing polymer obtained by copolymerizing the above-mentioned polymerizable, unsaturated, half-esterified product (a), acid anhydride group-containing, polymerizable unsaturated monomer (b) and another polymerizable unsaturated monomer (c). The copolymerization ratio of each component is not critical but can be selected optionally according to the application purposes etc. of the present composition but is suitable in the range of generally 5–85% by weight, particularly 10–65% by weight, more particularly 15–40% by weight of the component (a), 5–45% by weight, particularly 10–35% by weight, more particularly 15–25% by weight of the component (b), and 0–90% by weight, particularly 10–80% by weight, more particularly 30–60% by weight of the component (c) based upon the total amount of these 3 components. Further, the number-average molecular weight of the polymer (A) is preferably in the range of generally 1000–50000, particularly 3000–30000. Furthermore, the polymer (A) can have an acid anhydride group equivalent in the range of generally 200–1000, preferably 300–800, more preferably 350–650.

Polymer (B)

The polymer (B) constituting a part of the present composition can be prepared by half-esterification through reaction of a monohydric alcohol to the acid anhydride group resulted from the monomer (b) unit constituting the polymer (A).

The monohydric alcohol reacting with the polymer (A) is an organic compound having one hydroxyl group in the molecule and there can be specifically mentioned, for example, alkanols such as methanol, ethanol, propanol, butanol etc.; monoalkyl ethers of alkylene glycol such as methyl cellosolve, ethyl cellosolve etc.; dialkylaminoalkanols such as dimethylaminoethanol etc. Above all, alkanols of carbon number of 1–5 are preferred. Such a monohydric alcohol reacts with the acid anhydride group of the polymer (A) and half-esterifies it and consequently each one carboxyl group and carboxylic ester group is formed from one acid anhydride group. The application ratio of the monohydric alcohol is suitably in the range of usually 1–3 moles, particularly 1.5–2.5 moles, more particularly 1.5–2 moles per 1 mole of the acid anhydride group of the polymer (A). This half-esterification reaction can be conducted under a usual condition, for example, at the temperture of room temperature to about 150° C., suitably in an organic solvent inert to the reaction.

The polymer (B) thus obtained has carboxyl group and carboxylic ester group and its acid value is preferably in the range of generally 15–350 mgKOH/g, particularly 30–300 mgKOH/g, more particularly 500–200 mgKOH/g.

Polymer (C)

The polymer (C) constituting the other part of the present composition is a polymer having both hydroxyl group and epoxy group in the molecule.

The polymer (C) can be obtained, for example, by copolymerizing a hydroxyl group-containing, polymerizable unsaturated monomer (α), an epoxy group-containing, polymerizable unsaturated monomer (β) and another polymerizable unsaturated monomer (γ). The above-mentioned hydroxyl group-containing, polymerizable unsaturated monomer (α) is a compound having each one of hydroxyl group and polymerizable unsaturated carbon-carbon double bond in the molecule and specifically the same substances as described above as usable for the preparation of the polymerizable, unsaturated, half-eaterified product (a) in the polymer (A) can be preferably used.

The epoxy group-containing, polymerizable unsaturated monomer (β) used for the preparation of the polymer (C) is a compound having each one of epoxy group and polymerizable unsaturated carbon-carbon double bond in the molecule and there can be specifically mentioned, for example, glycidyl acrylate, glycidyl methacrylate, allyl glycidyl ether, polymerizable unsaturated monomer wherein an epoxy group combines to an alicyclic skeleton, for example,

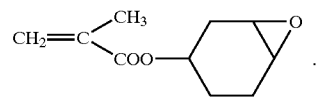

Further, as another polymerizable unsaturated monomer (γ) copolymerizable with the above-mentioned hydroxyl group-containing, polymerizable unsaturated monomer (α) and epoxy group-containing, polymerizable unsaturated monomer (β), there can be used substances suitably selected from the examples of the other polymerizable unsaturated monomer (γ) mentioned above as usable for the preparation of the polymer (A).

The copolymerization ratio of the hydroxyl group-containing, polymerizable unsaturated monomer (α), epoxy group-containing, polymerizable unsaturated monomer (β) and another polymerizable unsaturated monomer (γ) at the preparation of the polymer (C) is not strictly limited but can be selected optionally according to the application purposes etc. of the present composition, and is suitably in the range of generally 5–50%, particularly 10–45%, more particularly 15–30% of the component (α); 5–50%, particularly 10–45%, more particularly 20–40% of the component (β); 0–90%, particularly 0–80%, more particularly 30–60% of the component (γ) based upon the total weight of these 3 components.

The copolymerization of these monomers (α), (β) and (γ) can be conducted, for example, by a usual solution polymerization and the obtained polymer (C) has suitably in the range of 15–250 mgKOH/g, particularly 30–150 mgKOH/g, more particularly 50–125 mgKOH/g of a hydroxyl group value and 60–1000, particularly 100– 600, more particularly 350–550 of an epoxy equivalent and 1000–100000, particularly 3000–35000 of a number-average molecular weight.

Thermocurable Resin Composition for Coating

The thermocurable resin composition for coating provided by the present invention (the present composition) comprises the above-mentioned polymer (B) having carboxyl group and carboxylic ester group and polymer (C) having hydroxyl group and epoxy group.

The present composition can be prepared by compounding and mixing the polymer (B) and the polymer (C) in a suitable organic solvent and the compounding ratio of both polymers in that case is preferably in such a range that the relative molar ratio of the carboxyl group in the polymer (B) and the epoxy group in the polymer (C) becomes in the range of generally 1/0.5–1/2, particularly 1/0.8–1/1.5, more particularly 1/0.9–1/1.3 as carboxyl group/epoxy group. Further, the molar ratio of the carboxylic ester group in the polymer (B) and the hydroxyl group in the polymer (C) is preferable in the range of generally 1/0.5–1/2, particularly 1/0.8–1/1.5, more particularly 1/0.9–1/1.2 as carboxylic ester group/hydroxyl group. Furthermore, the ratio of the solid content weight of these both components is suitably in the range of 20–80%, particularly 35–70%, more particularly 40–60% of the polymer (B) and 80–20%, particularly 65–30%, more particularly 60–40% of the polymer (C) based upon the total weight of both.

The coating film formed by using the present composition can be easily cured through crosslinking by heating at the temperature of about 120° C.–about 160° C. for about 10–40 minutes. Though the curing mechanism is not sufficiently elucidated, it is estimated as follows: by heating the carboxyl group and the carboxylic ester group in the polymer (B) react to regenerate an acid an hydride group and to simultaneously isolate a free monohydric alcohol, which is eliminated by evaporation during heating: the regenerated acid anhydride group reacts with the hydroxyl group contained in the polymer (C) and crosslinks and a carboxyl group is formed again: this carboxyl group and the carboxyl group in the polymer (B) react with the epoxy group contained in the polymer (C) to crosslink.

To the present composition, in addition to the above-mentioned polymer (B) and polymer (C) there can be further compounded usual additives for paint such as color pigment, metallic pigment, iridescent pigment, extender pigment, curing catalyst, curing agent, ultraviolet absorbent, light stabilizer, flow adjustment agent etc.

As the cured coating film formed by the present composition is excellent in performances such as curability, acid resistance, scratch resistance etc., the present composition can be favorably used for a topcoat paint for outer panels of substrates; such as motorcar body, electric appliances etc. made of metal or plastics. Specifically, for example, these substrates can be directly, or after coating and curing with an undercoat paint such as a cationic electrodeposition paint etc. and optionally further with an intermediate paint, 1) coated with a solid color topcoat paint comprising the present composition, or 2) coated with a usual solid color or metallic topcoat paint and then coated on the coating surface with a clear topcoat paint comprising the present composition.

The coating of the present composition can be conducted, for example, by airless spray, air spray, electrostatic coating etc., after adjusting the solid content at the coating to 20–75% by weight. The film thickness is suitably in the range of 10–100 μm as cured coating film and the coating film can be cured through crosslinking by heating at the temperature of about 120–about 160° C. for about 10–40 minutes.

As mentioned above, the present composition is a thermocurable resin composition for coating with good storage stability and capable of forming a coating film excellent in low temperature curability, acid resistance, scratch resistance etc. and can be used particularly effectively for a topcoat paint for motorcar body.

EXAMPLES

Then the present invention will be described more specifically by example and comparative example. Parts and % are both based upon weight and the film thickness of the coating film is that of the cured coating film.

1. Preparation of Test Sample

1) Polymerizable, Unsaturated, Half-esterified Product (a)

(a1): In the nitrogen atmosphere, 28 parts of organic solvent (butyl acetate), 130 parts (1 mole) of 2-hydroxypropyl acrylate, 120 parts (1.2 moles) of succinic anhydride and 0.5 parts of hydroquinone monomethyl ether as polymerization inhibitior are mixed and reacted by heating at 150° C. for 20 minutes to obtain a polymerizable, unsaturated, half-esterified product (a1).

(a2): In the nitrogen atmosphere, 23 parts of organic solvent (butyl acetate), 130 parts (1 mole) of 2-hydroxypropyl acrylate, 80 parts (0.8 moles) of succinic anhydride and 0.5 parts of hydroquinone monomethyl ether as polymerization inhibitior are mixed and reacted by heating at 150° C. for 20 minutes to obtain a polymerizable, unsaturated, half-esterified product (a2) (for comparative example).

2) Polymer (A)

(A1): In the nitrogen atmosphere, 80 parts of organic solvent (xylene) were placed in a reaction vessel and heated to 140° C., then 30 parts of the polymerizable, unsaturated,: half-esterified product (a1), 20 parts of maleic anhydride, 30 parts of butyl acrylate, 10 parts of lauryl methacryalte, 10 parts of styrene, 20 parts of organic solvent (butyl acetate) and 4 parts of polymerization catalyst (t-butyl peroxyoctanoate) were added drop by drop to the solvent in 3 hours and the mixture was further stirred at the same temperature for 2 hours to obtain a solution of polymer (A1) of solid content 50% and number-average molecular weight 6500.

(A2): In the nitrogen atmosphere, 80 parts of organic solvent (xylene) were placed in a reaction vessel and heated to 140° C., then 25 parts of the polymerizable, unsaturated, half-esterified product (a2), 20 parts of maleic anhydride, 30 parts of butyl acrylate, 15 parts of lauryl methacryalte, 10 parts of styrene, 20 parts of organic solvent (butyl acetate) and 4 parts of polymerization catalyst (t-butyl peroxyoctanoate) were added drop by drop to the solvent in 3 hours and the mixture was further stirred at the: same temperature for 2 hours to obtain a solution of polymer (A2) of solid content 50% and number-average molecular weight 6500 (for comparative example).

3) Polymer (B)

(B1): It was obtained by adding 10 parts of methanol to 100 parts (as solid content) of the polymer (A1) solution and reacting for half-esterification at 90° C. for 8 hours. Acid value of the obtained polymer (B1) was 188 mgKOH/g.

(B2): It was obtained by adding 10 parts of methanol to 100 parts (as solid content) of the polymer (A2) solution and reacting for half-esterification at 90° C. for 8 hours. Acid value of the obtained polymer (B2) was 180 mgKOH/g (for comparative example).

4) Polymer (C)

(C1): In the nitrogen atmosphere, 100 parts of organic solvent (xylene/n-butanol=80/20 ratio by weight) were placed in a reaction vessel and heated to 130° C., then 20 parts of 2-hydroxypropyl acrylate, 35 parts of glycidyl methacryalate, 25 parts of butyl acrylate, 20 parts of styrene and 5 parts of azobisisobutyronitrile were added drop by drop to the solvent in 3 hours and the mixture was kept at the same temperature for 1 hour to obtain a solution of the polymer (C1) of solid content 50%, hydroxyl group value 86 mgKOH/g, epoxy equivalent 406 and number-average molecular weight 7000.

2. Example and Comparative Example

Clear paints were obtained by mixing the above-mentioned polymer (B) and polymer (C) at the solid content weight proportions described in Table 1. They were adjusted with organic solvent (xylene) to solid content 45% and viscosity 30 seconds/Ford cup #4/20° C.

On a steel plate coated with the cationic electrodeposition paint ("Elecron #9800", made by Kansai Paint Co., Ltd., trade name) and the intermediate paint ("Amilac TP 37", made by Kansai Paint Co., Ltd., trade name) and cured by heating, the metallic paint ("Magicron TB-510(A)", made by Kansai Paint Co., Ltd., trade name) was coated to film thickness 15 μm and left at room temperature for 5 minutes, then the above-mentioned clear paint was coated so that the film thickness would be 40 μm and left at room temperature for 5 minutes, and then both coating films of the metallic paint and the clear paint were simultaneously cured by heating at 140° C. for 30 minutes. There were conducted tests of the storage stability and low temperature curability of the clear paints obtained as mentioned above and of the performances (acid resistance and scratch resistance) of the cured coating films of the clear paints of coating plates for test thus obtained. The results are also mentioned in Table 1.

Test methods in Table 1 are as follows.

Storage Stability

The viscosity increase of clear paint was examined, after it had been adjusted to viscosity 30 seconds/Ford cup #4/20° C., tightly closed in a vessel and left at room temperature for 1 month. ○: Viscosity increase is within 10 seconds, Δ: viscosity increase is 10–20 seconds, ×: viscosity increase is more than 20 seconds.

Low Temperature Curability

Pencil hardness (20° C.) of the coating film of clear paint, cured by heating at 120° C. for 30 minutes, after being coated on a glass plate so that the film thickness would be 40 μm and left at room temperature for 5 minutes, was examined.

Acid Resistance

Condition of the coating surface of clear paint was visually observed, after 0.2 cc of 40% aqueous solution of sulfuric acid was dropped on the coating surface and heated at 80° C. for 30 minutes. ○: No abnormality is observed at all, Δ: A little depression is observed, ×: Many depressions and blisters are observed.

Scratch Resistance

Clear coating film surface was visually observed, after the coated test plate had been stuck on the outer roof surface of a motorcar and the car was washed 15 times with a car-washing machine. ○: A little scratch generates, but slight, Δ: Generation of scratches are noticeable and the appearance deteriorates, ×: Generation of scratches are remarkable.

TABLE 1

|  | Example 1 | Comparative example 1 |
|---|---|---|
| Polymer (B) | B1 | B2 |
| Compounding amount | 55 | 55 |
| Polymer (C) | C1 | C1 |
| Compounding amount | 45 | 45 |
| Performance test result |  |  |
| Storage stability | ○ | Δ |
| Low temperature curability | F | F |
| Acid resistance | ○ | ○ |
| Scratch resistance | ○ | Δ |

What is claimed is:

1. A thermocurable resin composition for coating characterized by containing
   (i) a polymer (B) obtained by copolymerizing
      (a) a polymerizable, unsaturated, half-esterified product obtained by half-esterification of a hydroxyl group-containing, polymerizable unsaturated monomer and an acid anhydride group-containing compound in the proportion of 1–1.5 moles of acid anhydride group per 1 mole of hydroxyl group,
      (b) an acid anhydride group-containing, polymerizable unsaturated monomer, and
      (c) another polymerizable unsaturated monomer, to form an acid anhydride group-containing polymer (A) and half-esterifying the acid anhydride group of the polymer (A) with
      (d) a monohydric alcohol, and
   (ii) a polymer (C) having both hydroxyl group and epoxy group in the molecule.

2. The composition set forth in claim 1 wherein the hydroxyl group-containing, polymerizable unsaturated monomer used to obtain the polymerizable, unsaturated, half-esterified product (a) is a $C_2$–$C_{24}$ hydroxyalkyl ester of acrylic acid or methacrylic acid.

3. The composition set forth in claim 1 wherein the acid anhydride group-containing compound used to obtain the polymerizable, unsaturated, half-esterified product (a) is succinic anhydride.

4. The composition set forth in claim 1 wherein the polymerizable, unsaturated, half-esterified product (a) is a product obtained by half-esterifying a hydroxyl group-containing, polymerizable unsaturated monomer and an acid anhydride group-containing compound in the proportion of 1.02–1.3 moles of the acid anhydride group per 1 mole of the hydroxyl group.

5. The composition set forth in claim 1 wherein the acid anhydride group-containing, polymerizable unsaturated monomer (b) is selected from the group consisting of maleic anhydride, itaconic anhydride and citraconic anhydride.

6. The composition set forth in claim 1 wherein the polymer (A) is a product obtained by copolymerizing
   5–85% by weight of polymerizable, unsaturated, half-esterified product (a),
   5–45% by weight of acid anhydride group-containing, polymerizable unsaturated monomer (b) and
   10–90% by weight of other polymerizable unsaturated monomer (c).

7. The composition set forth in claim 1 wherein the polymer (A) is a product obtained by copolymerizing
   10–65% by weight of polymerizable, unsaturated, half-esterified product (a),
   10–35% by weight of acid anhydride group-containing, polymerizable unsaturated monomer (b) and
   10–80% by weight of other polymerizable unsaturated monomer (c).

8. The composition set forth in claim 1 wherein the polymer (A) is a product having a number-average molecular weight in the range of 1000–50000.

9. The composition set forth in claim 1 wherein the polymer (A) is a product having an acid anhydride group equivalent in the range of 200–1000.

10. The composition set forth in claim 1 wherein the monohydric alcohol (d) is selected from the group consisting of alkanols, monoalkyl ethers of alkylene glycols and dialkylaminoalkanols.

11. The composition set forth in claim 1 wherein the monohydric alcohol (d) is an alkanol of carbon number of 1–5.

12. The composition set forth in claim 1 wherein the polymer (B) is a product obtained by half-esterification at the proportion in the range of 1–3 moles of monohydric alcohol per 1 mole of acid anhydride group of the monomer (A).

13. The composition set forth in claim 1 wherein the polymer (B) is a product having an acid value in the range of 15–350 mgKOH/g.

14. The composition set forth in claim 1 wherein the polymer (B) is a product having an acid value in the range of 30–300 mgKOH/g.

15. The composition set forth in claim 1 wherein the polymer (C) is a copolymer of a hydroxyl group-containing, polymerizable unsaturated monomer ($\alpha$), an epoxy group-containing, polymerizable unsaturated monomer ($\beta$) and, optionally, another polymerizable unsaturated monomer ($\gamma$).

16. The composition set forth in claim 15 wherein the polymer (C) is a product obtained by copolymerizing 5–50% by weight of the monomer ($\alpha$), 5–50% by weight of the monomer ($\beta$) and 0–90% by weight of the monomer ($\gamma$).

17. The composition set forth in claim 1 wherein the polymer (C) is a product having a hydroxyl group value in the range of 15–250 mgKOH/g.

18. The composition set forth in claim 1 wherein the polymer (C) is a product having a hydroxyl group value in the range of 30–150 mgKOH/g.

19. The composition set forth in claim 1 wherein the polymer (C) is a product having an epoxy equivalent in the range of 60–1000.

20. The composition set forth in claim 1 wherein the polymer (C) is a product having an epoxy equivalent in the range of 100–500.

21. The composition set forth in claim 1 wherein the molar ratio of the carboxyl group in the polymer (B) to the epoxy group in the polymer (C) is in the range of 1/0.5–1/2.

22. The composition set forth in claim 1 wherein the molar ratio of the carboxyl group in the polymer (B) to the epoxy group in the polymer (C) is in the range of 1/0.8–1/1.5.

23. The composition set forth in claim 1 containing 20–80% of the polymer (B) and 80–20% of the polymer (C) based upon the total solid content weight of the polymer (B) and the polymer (C).

24. The composition set forth in claim 1 containing 35–70% of the polymer (B) and 65–30% of the polymer (C) based upon the total solid content weight of the polymer (B) and the polymer (C).

25. A topcoat paint comprising the thermocurable resin composition set forth in claim 1.

26. The topcoat paint set forth in claim 25 which is for motorcar body.

27. An article coated by using the composition set forth in claim 1.

* * * * *